May 17, 1932.   F. J. GANTNIER   1,858,585
PHOTOGRAPHIC FILM CARTRIDGE
Filed Aug. 18, 1930
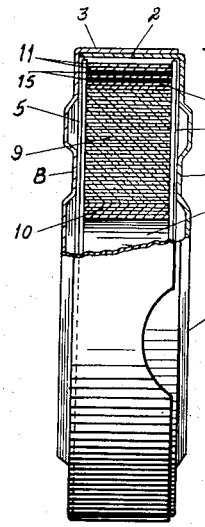
Fig.1.
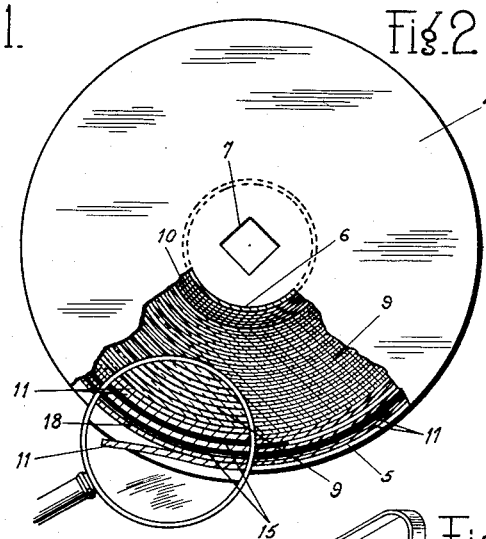
Fig.2.
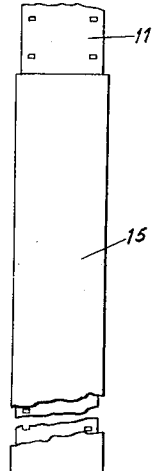
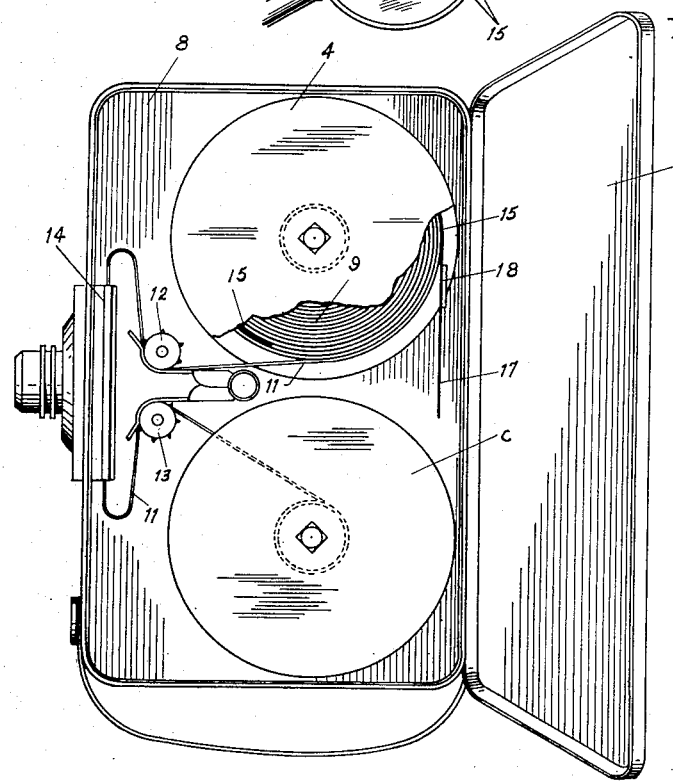
Fig.3.
Fig.5.
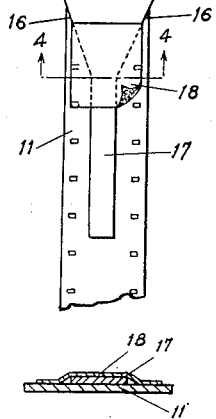
Fig.4.
INVENTOR.
FRANK J. GANTNIER.
BY Philip S. Hopkins
ATTORNEY.

Patented May 17, 1932

1,858,585

UNITED STATES PATENT OFFICE

FRANK J. GANTNIER, OF BINGHAMTON, NEW YORK, ASSIGNOR TO AGFA ANSCO CORPORATION, OF BINGHAMTON, NEW YORK, A CORPORATION OF NEW YORK

PHOTOGRAPHIC FILM CARTRIDGE

Application filed August 18, 1930. Serial No. 475,949.

My invention relates to photographic film cartridges and particularly to that type used in motion picture cameras, more especially the small "amateur" type of motion picture cameras using reels of film 50 feet or 100 feet in length. My invention is more particularly adaptable to film reels of this character because of the necessity of providing means whereby the film may be loaded into the camera in daylight without danger of light fog.

Ordinarily a film cartridge of this character consists of a reel comprising two parallel flanges mounted upon a hub around which and between the flanges of which the film is wound, there being a leader strip of protective paper of the same width as the film attached to the front and rear ends of the coils of film. This reel with the film thereon is usually placed in a two piece flanged box for transportation and protection from light. When loading the camera with a film cartridge of this type, this box or housing must be all or partially removed from the reel to permit threading the leader strip and film through the camera mechanism. During this threading operation, there is a possibility that light may enter the reel between one of the flanges and the convolutions of film and thus fog the film. This may be caused by shrinkage of the film and leader strip away from the spool flanges or by improper parallel alignment of the flanges or by inaccurate cutting of the film and leader strips so that they are narrower than the space between the flanges of the reel.

In order to guard against such light exposure and fogging up to the time of actual closing of the camera, and after the threading operation has been completed, I have provided means in the film cartridge or reel itself for protecting the edges of the film from light exposure while the front leader strip is being threaded through the camera mechanism.

One of the principal advantages of my invention is that it makes it possible for the operator to remove the box or protective housing for the film cartridge entirely during the threading operation, thus greatly facilitating the same by eliminating the clumsy operation of threading while a portion of the housing is still around the reel.

Another object of my invention is to provide a protective device for this purpose which is simple and inexpensive and which in no way hinders or interferes with the normal threading and winding operations of the camera.

Still another object of my invention, and an important one, is that it eliminates the necessity for the very fine and accurate construction of the film spools or reels and the cutting of the film and leader strips.

Another object and advantage lies in the fact that my invention adequately protects the film from light exposure regardless of shrinkage thereof away from the flanges of the reel.

Other objects and advantages in details of construction and arrangement of parts will be apparent as the description proceeds, reference now being had to the figures of the accompanying drawings forming a part of this application and wherein like reference numerals indicate like parts.

In the drawings:—

Figure 1 is an edge view of a film package embodying my invention with certain parts being broken away and certain parts being shown in section for clearness of illustration.

Figure 2 is a side view of my invention, certain parts being broken away and in section and a portion thereof magnified for clearness.

Figure 3 is a detail view of a section of the leader strip of a film cartridge showing my invention in its relation thereto.

Figure 4 is a detail cross sectional view taken on the line 4—4 of Figure 3.

Figure 5 is a side view of a motion picture camera with the door open, illustrating the use of my invention.

While my invention is particularly useful and adaptable for film cartridges of the motion picture type, it will be understood that it is not limited thereto, but readily lends itself to use on reels or material wherein it is desired to protect the convolutions of such material between the reel flanges.

The reference character 1 indicates the usual box or housing commonly used to enclose film reels of this character, the housing being formed of the two parts A and B provided respectively with the flanges 2 and 3 which telescope one over the other to provide a light-tight casing for the film reel. The film reel comprises the substantially parallel side flanges 4 and 5 held in spaced relation by the circular hub 6 to which the flanges are suitably secured. The hub 6 is provided with the usual central opening 7 whereby the reel may be supported within the camera 8.

In making up the reel of film for use in the camera, the inner end of the film has secured thereto one end of a leader strip 10 of opaque paper or like material, preferably of exactly the same width as the film 9, and perforated in the same manner. This leader strip 10 is first wound around the hub 6 and then the film 9 is wound therearound in the manner shown clearly in Figures 1 and 2. The purpose of this inner leader strip is of course to protect the film when the same has be unwound from one reel and wound upon another in the normal operation of the camera, at which time, of course, the inner leader strip 10 becomes the outer leader strip covering the outer convolutions of film on the takeup reel.

Attached to the outer end of the film 9 is a second leader strip 11 similar in all respects to the leader strip 10, which covers and protects the outer convolutions of film 9 and permits threading through the camera mechanism, that is around the sprockets 12 and 13 and through the gate 14 to the takeup reel indicated at C in Figure 5. This outer leader strip 11 is of such length as to permit this threading operation without exposure of the outer convolutions of film to the light during the threading operation.

As before stated, however, due to various causes, light may leak past edges of the outer leader strip 11 between the same and the flanges 4 and 5, and thus reach the edges of the film 9 coiled upon the reel. In order to prevent this possible leakage and to adequately protect the film against such exposure when the housing 1 has been removed from around the reel and during the threading operation illustrated in Figure 5, I have provided between certain of the convolutions of the outer leader strip 11 a protective strip 15 of opaque paper or other suitable material, which is wider than the leader strip 11, and film 9 and which is also slightly wider than the space between the flanges 4 and 5. Consequently this protective strip 15 extends beyond the edges of the film 9 and leader strip 11 and tightly engages the inner surfaces of the flanges 4 and 5. The flexibility of the protective strip 15 permits its being wound with the leader strip 11 around the reel with its edges in tight fitting engagement against the inner flange surfaces.

The length of the protective strip 15 is preferably such as to completely encircle the wound film and leader strip 11 with its ends overlapping whereby the edges of the film 9 wound beneath this strip are adequately protected against light passing between the flanges of the reel.

The leader strip 11 is of such length as to permit several additional convolutions thereof on top and around the protective strip 15, whereby sufficient leader strip is provided for threading the camera in the manner indicated in Figure 5 before reaching the protective strip 15. Thus the film 9 remains entirely protected during the threading operation.

The outer end of the protective strip 15 is preferably cut inwardly from its edges as at 16 to provide the tongue 17 forming a convenient finger piece by means of which the strip may be pulled out from between the flanges 4 and 5 when the threading operation has been completed and the operator is ready to close the camera.

This protective strip 15 may be entirely unattached to the leader strip 11 or it may be provided adjacent its outer end with a gummed sticker 18 secured adjacent the reduced end 17, and the overhanging edges of which are adapted to contact with and lightly stick to the leader strip 11 at that point. Obviously, when the sticker 18 is used, the lifting of the tongue 17 serves to easily strip the sticker from the leader strip and permit the protective strip 15 to be readily removed from around the reel.

The operation of the invention is evident from the foregoing description. The operator merely removes the film reel from the housing 1, in perfect safety from light exposure, and places the reel in the supply position in the camera. The leader strip 11 is then unwound to an extent sufficient to permit threading of the leader strip around the sprockets 12 and 13 and through the gate 14, attaching the free end of the strip to the takeup reel C. This leader strip 11 is then fed through the camera and wound upon the takeup reel C until the tongue 17 of the protective strip 15 is exposed, whereupon the operator merely grasps the tongue 17 and pulls outwardly thereon to remove the sticker 18, if the same is used, and continues the winding operation until the protective strip 15 is removed from about the reel, whereupon the door D of the camera is closed. The operator then continues the winding of the leader strip 11 upon the takeup reel C until the film 9 is presented at the exposure station of the camera, whereupon the camera is ready for use.

Of course, changes may be made in details without departing from the spirit and scope of my invention. I do not limit myself therefore to the specific form herein shown and described other than by the appended claims.

I claim:

1. A film cartridge comprising a reel having a hub and spaced flanges adapted to receive windings of film thereon, a leader strip attached at one end to the outer end of the wound film and wound about the same on said reel, and a protective strip interwound with said leader strip, said protective strip being slightly wider than said leader strip and the space between said flanges.

2. A film cartridge comprising a reel having a hub and spaced flanges adapted to receive windings of film thereon, a leader strip attached at one end to the outer end of the wound film and wound about the same on said reel, and a protective strip interwound with said leader strip, said protective strip being slightly wider than the space between said flanges, and provided with a reduced front end forming a finger piece.

3. A film cartridge comprising a reel having a hub and spaced flanges adapted to receive windings of film thereon, a leader strip attached at one end to the outer end of the wound film and wound about the same on said reel, and a protective strip interwound with said leader strip and intermediate the ends thereof, said leader strip being of a length beyond said protective strip sufficient to permit threading the same through a camera without removing said protective strip from the reel.

4. A film cartridge comprising a reel having a hub and spaced flanges adapted to receive windings of film thereon, a leader strip attached at one end to the outer end of the wound film and wound about the same on said reel, and a protective strip interwound with said leader strip, said protective strip being readily removable.

5. A film cartridge comprising a reel having a hub and spaced flanges adapted to receive windings of film thereon, a leader strip attached at one end to the outer end of the sound film and wound about the same on said reel, and a protective strip interwound with said leader strip, and a sticker on said protective strip adapted to adhere lightly to the adjacent convolution of leader strip.

6. A film cartridge comprising a reel having a hub and spaced flanges adapted to receive windings of film thereon, a leader strip attached at one end to the outer end of the sound film and wound about the same on said reel, and a protective strip interwound with said leader strip, and a sticker on said protective strip adapted to adhere lightly to the adjacent convolution of leader strip, the extreme front end of said protective strip being free of said sticker whereby the same may be readily disengaged from said leader strip.

In testimony whereof, I affix my signature.

FRANK J. GANTNIER.